(12) United States Patent
Kimura

(10) Patent No.: US 8,732,851 B2
(45) Date of Patent: May 20, 2014

(54) IMAGE FORMING APPARATUS AND INFORMATION PROCESSING METHOD

(75) Inventor: Hiroyuki Kimura, Kawasaki (JP)

(73) Assignee: Canon Kabushiki Kaisha (JP)

(*) Notice: Subject to any disclaimer, the term of this patent is extended or adjusted under 35 U.S.C. 154(b) by 1035 days.

(21) Appl. No.: 11/695,631

(22) Filed: Apr. 3, 2007

(65) Prior Publication Data

US 2007/0240228 A1     Oct. 11, 2007

(30) Foreign Application Priority Data

Apr. 10, 2006  (JP) .................................. 2006-108028

(51) Int. Cl.
 *H04L 29/00* (2006.01)
 *H04N 1/195* (2006.01)
 *H04N 1/00* (2006.01)

(52) U.S. Cl.
 CPC . *H04N 1/195* (2013.01); *H04N 1/00* (2013.01)
 USPC ............. 726/28; 726/27; 358/1.14; 358/1.15; 382/254

(58) Field of Classification Search
 CPC .................................. H04N 1/00; H04N 1/95
 USPC .................... 726/27; 358/1.14, 1.15; 382/254
 See application file for complete search history.

(56) References Cited

U.S. PATENT DOCUMENTS

| | | | |
|---|---|---|---|
| 6,055,530 A * | 4/2000 | Sato ........................................ | 1/1 |
| 7,493,491 B2 | 2/2009 | Ootsuka et al. | |
| 2002/0114002 A1 | 8/2002 | Mitsubori et al. | |
| 2003/0061166 A1 | 3/2003 | Saito et al. | |
| 2003/0123079 A1 | 7/2003 | Yamaguchi et al. | |
| 2003/0182190 A1 | 9/2003 | Bergerioux | |
| 2004/0133636 A1 | 7/2004 | Kinoshita et al. | |
| 2005/0219607 A1 | 10/2005 | Yamaguchi et al. | |

(Continued)

FOREIGN PATENT DOCUMENTS

| | | |
|---|---|---|
| JP | 2000-285054 A | 10/2000 |
| JP | 2001-243031 A | 9/2001 |

(Continued)

OTHER PUBLICATIONS

Office Action issued in CN200710089812.8 which corresponds with related co-pending U.S. Appl. No. 11/685,996. Dated Dec. 5, 2008.

(Continued)

*Primary Examiner* — Brandon Hoffman
*Assistant Examiner* — Michael D Anderson
(74) *Attorney, Agent, or Firm* — Rossi, Kimms & McDowell LLP

(57) ABSTRACT

This invention achieves to prevent information leakage as much as possible when a material printed by an image forming apparatus is left unrecovered. This invention relates to an information processing method in an image forming apparatus capable of printing a Web page displayed by a browser, including a step of, when an instruction to display a Web page is input, searching a storage unit which stores information representing the confidentiality of the Web page and its URL in advance in correspondence with each other, a step of reading out, from the storage unit based on the search result, information which corresponds to the URL of the display instruction-input Web page and represents the confidentiality of the Web page, and a step of printing, together with the Web page displayed based on the display instruction, the readout information representing the confidentiality of the Web page.

20 Claims, 17 Drawing Sheets

1401

| # | URL | CONTENTS LOCATION | SECURITY | REGISTERED PHRASE | | |
|---|---|---|---|---|---|---|
| | | | | DEPARTMENT MANAGER | SECTION CHIEF | GENERAL |
| 1 | http://www.xxx.co.jp/aaa/aaa.html | INSIDE COMPANY | HIGH | HANDLE WITH CARE | INTERNAL USE ONLY | TOP-SECRET MATERIAL |
| 2 | http://www.xxx.co.jp/bbb/bbb.pdf | INSIDE COMPANY | MIDDLE | - | HANDLE WITH CARE | PRINT INHIBITED |
| 3 | http://www.xxx.co.jp/ccc/ccc.pdf | INSIDE COMPANY | LOW | | | HANDLE WITH CARE |
| 4 | http://www.XYZ.co.jp | OUTSIDE COMPANY | NONE | - | - | |

(56) References Cited

U.S. PATENT DOCUMENTS

| | | | |
|---|---|---|---|
| 2006/0023247 A1* | 2/2006 | Yamakawa | 358/1.14 |
| 2006/0028669 A1 | 2/2006 | Kumagai | |
| 2006/0037055 A1 | 2/2006 | Hashimoto et al. | |
| 2006/0050290 A1 | 3/2006 | Kondo | |
| 2006/0056873 A1 | 3/2006 | Kimura | |
| 2006/0120616 A1* | 6/2006 | Kita | 382/254 |
| 2006/0256375 A1* | 11/2006 | Abe | 358/1.15 |
| 2007/0229885 A1 | 10/2007 | Kimura | |

FOREIGN PATENT DOCUMENTS

| | | |
|---|---|---|
| JP | 2001-325249 A | 11/2001 |
| JP | 2003-48361 A | 2/2003 |
| JP | 2003-048361 A | 2/2003 |
| JP | 2003-099400 A | 4/2003 |
| JP | 2003-122279 A | 4/2003 |
| JP | 2003-271341 A | 9/2003 |
| JP | 2003-283755 A | 10/2003 |
| JP | 2004-110399 A | 4/2004 |
| JP | 2004-110738 A | 4/2004 |
| JP | 2004-213128 A | 7/2004 |
| JP | 2005-204242 A | 7/2005 |
| JP | 2006-040076 A | 2/2006 |
| JP | 2006-050236 A | 2/2006 |

OTHER PUBLICATIONS

Office Action issued in corresponding Japanese Patent Application No. 2006-095842 dated Nov. 12, 2010.

Office Action issued in corresponding Japanese Patent Application No. 2006-108028 dated Feb. 4, 2011.

Office Action issued in corresponding Japanese Patent Application No. 2006-095842 dated Nov. 12, 2010, which is the foreign counterpart of related co-pending U.S. Appl. No. 11/685,996.

* cited by examiner

F I G. 4
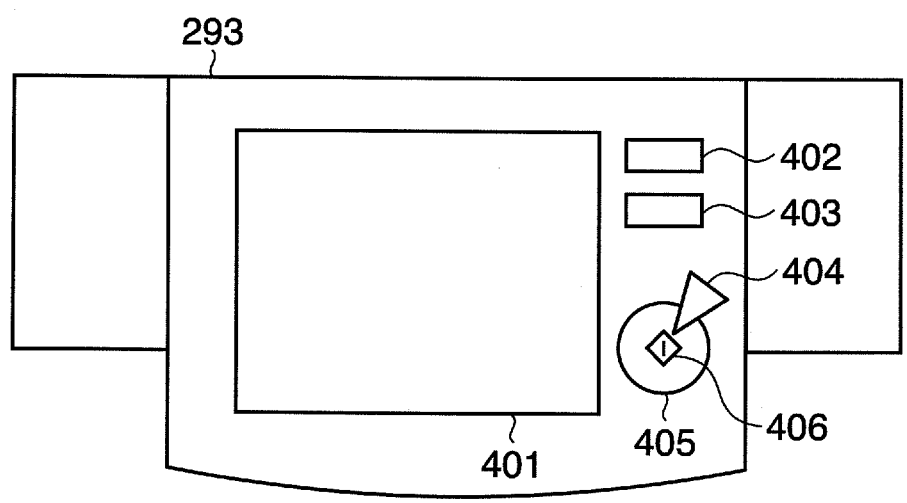

FIG. 12

| # | URL 701 | SECURITY 702 | REGISTERED PHRASE 1201 ||||
|---|---|---|---|---|---|
| | | | DEPARTMENT MANAGER | SECTION CHIEF | GENERAL |
| 1 | http://www.xxx.co.jp/aaa/aaa.html | HIGH | HANDLE WITH CARE | INTERNAL USE ONLY | TOP-SECRET MATERIAL |
| 2 | http://www.xxx.co.jp/bbb/bbb.pdf | MIDDLE | - | HANDLE WITH CARE | PRINT INHIBITED |
| 3 | http://www.xxx.co.jp/ccc/ccc.pdf | LOW | - | - | HANDLE WITH CARE |
| 4 | http://www.XYZ.co.jp | NONE | | | |

F I G. 13
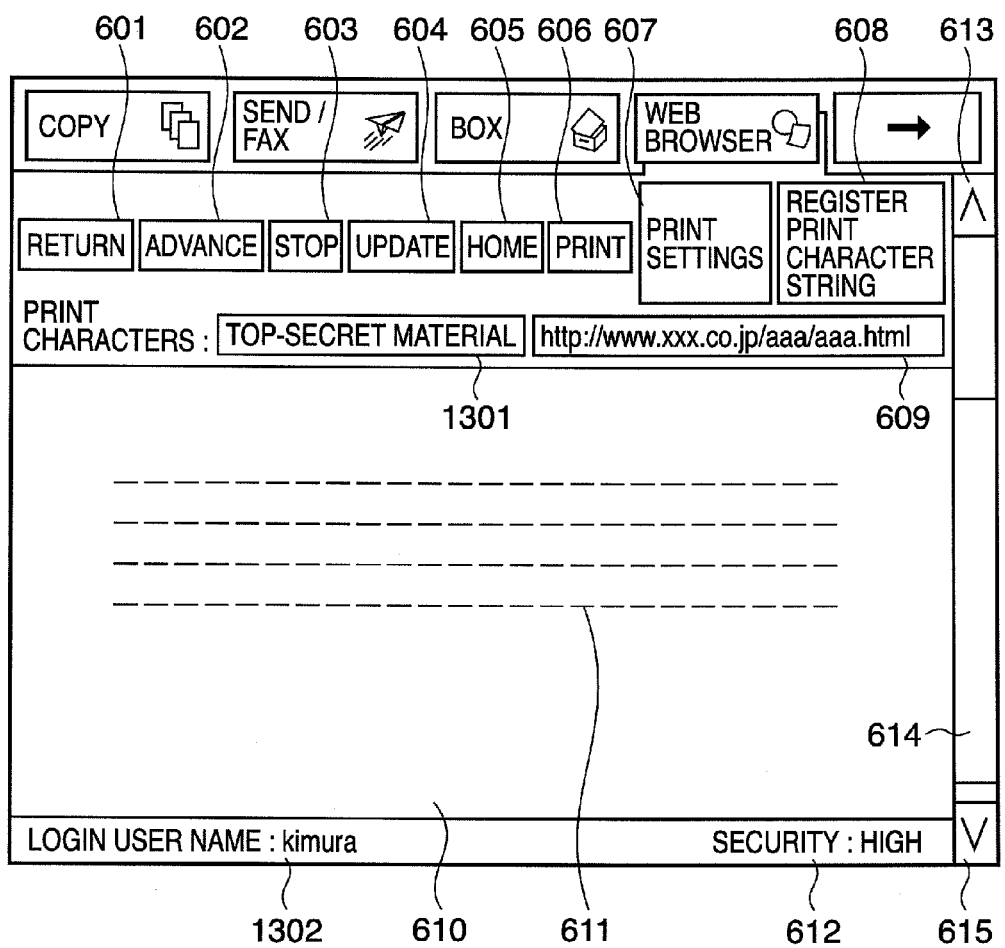

FIG. 14

| # | URL | CONTENTS LOCATION | SECURITY | REGISTERED PHRASE | | | |
|---|---|---|---|---|---|---|---|
| | | | | DEPARTMENT MANAGER | SECTION CHIEF | GENERAL | |
| 1 | http://www.xxx.co.jp/aaa/aaa.html | INSIDE COMPANY | HIGH | HANDLE WITH CARE | INTERNAL USE ONLY | TOP-SECRET MATERIAL | |
| 2 | http://www.xxx.co.jp/bbb/bbb.pdf | INSIDE COMPANY | MIDDLE | | HANDLE WITH CARE | PRINT INHIBITED | |
| 3 | http://www.xxx.co.jp/ccc/ccc.pdf | INSIDE COMPANY | LOW | | | HANDLE WITH CARE | |
| 4 | http://www.XYZ.co.jp | OUTSIDE COMPANY | NONE | - | - | | |

MFP 101

| # | URL | CONTENTS LOCATION | SECURITY | REGISTERED PHRASE | | |
|---|---|---|---|---|---|---|
| | | | | DEPARTMENT MANAGER | SECTION CHIEF | GENERAL |
| 1 | http://www.xxx.co.jp/aaa/aaa.html | INSIDE COMPANY | HIGH | HANDLE WITH CARE | INTERNAL USE ONLY | TOP-SECRET MATERIAL |
| 2 | http://www.xxx.co.jp/bbb/bbb.pdf | INSIDE COMPANY | MIDDLE | | HANDLE WITH CARE | PRINT INHIBITED |
| 3 | http://www.xxx.co.jp/ccc/ccc.pdf | INSIDE COMPANY | LOW | | | HANDLE WITH CARE |
| 4 | http://www.XYZ.co.jp | OUTSIDE COMPANY | NONE | - | - | - |

FIG. 15B

MFP 102

| # | URL | CONTENTS LOCATION | SECURITY | REGISTERED PHRASE | | |
|---|---|---|---|---|---|---|
| | | | | DEPARTMENT MANAGER | SECTION CHIEF | GENERAL |
| 1 | http://www.xxx.co.jp/aaa/aaa.html | INSIDE COMPANY | HIGH | HANDLE WITH CARE | INTERNAL USE ONLY | TOP-SECRET MATERIAL |
| 2 | http://www.xxx.co.jp/bbb/bbb.pdf | INSIDE COMPANY | MIDDLE | HANDLE WITH CARE | HANDLE WITH CARE | PRINT INHIBITED |
| 3 | http://www.xxx.co.jp/ccc/ccc.pdf | INSIDE COMPANY | LOW | | HANDLE WITH CARE | HANDLE WITH CARE |
| 4 | http://www.XYZ.co.jp | OUTSIDE COMPANY | NONE | - | - | - |

FIG. 15C

FACSIMILE APPARATUS 107

| # | URL | CONTENTS LOCATION | SECURITY | REGISTERED PHRASE | | |
|---|---|---|---|---|---|---|
| | | | | DEPARTMENT MANAGER | SECTION CHIEF | GENERAL |
| 1 | http://www.xxx.co.jp/aaa/aaa.html | INSIDE COMPANY | HIGH | HANDLE WITH CARE | INTERNAL USE ONLY | TOP-SECRET MATERIAL |
| 2 | http://www.xxx.co.jp/bbb/bbb.pdf | INSIDE COMPANY | MIDDLE | HANDLE WITH CARE | HANDLE WITH CARE | PRINT INHIBITED |
| 3 | http://www.xxx.co.jp/ccc/ccc.pdf | INSIDE COMPANY | LOW | HANDLE WITH CARE | HANDLE WITH CARE | HANDLE WITH CARE |
| 4 | http://www.XYZ.co.jp | OUTSIDE COMPANY | NONE | - | - | - |

FIG. 16

| # | URL | CONTENTS LOCATION | SECURITY | DEPARTMENT MANAGER ||| SECTION CHIEF ||| GENERAL |||
|---|---|---|---|---|---|---|---|---|---|---|---|---|
| | | | | REGISTERED PHRASE | CHARACTER SIZE | PRINT START POSITION | REGISTERED PHRASE | CHARACTER SIZE | PRINT START POSITION | REGISTERED PHRASE | CHARACTER SIZE | PRINT START POSITION |
| 1 | http://www.xxx.co.jp/aaa/aaa.html | INSIDE COMPANY | HIGH | HANDLE WITH CARE | 24 | (10, 20) | INTERNAL USE ONLY | 36 | (10, 20) | TOP-SECRET MATERIAL | 48 | (10, 20) |
| 2 | http://www.xxx.co.jp/bbb/bbb.pdf | INSIDE COMPANY | MIDDLE | HANDLE WITH CARE | 18 | (10, 30) | HANDLE WITH CARE | 24 | (10, 30) | PRINT INHIBITED | 36 | (10, 30) |
| 3 | http://www.xxx.co.jp/ccc/ccc.pdf | INSIDE COMPANY | LOW | HANDLE WITH CARE | 14 | (20, 40) | HANDLE WITH CARE | 18 | (20, 40) | HANDLE WITH CARE | 24 | (20, 40) |
| 4 | http://www.XYZ.co.jp | OUTSIDE COMPANY | NONE | | | | . | | | | | |

| # | URL | CONTENTS LOCATION | SECURITY | OUTPUT TIME | | | | | |
|---|---|---|---|---|---|---|---|---|---|
| | | | | 8:30-20:00 | | | 20:00-8:30 | | |
| | | | | REGISTERED PHRASE | | | REGISTERED PHRASE | | |
| | | | | DEPARTMENT MANAGER | SECTION CHIEF | GENERAL | DEPARTMENT MANAGER | SECTION CHIEF | GENERAL |
| 1 | http://www.xxx.co.jp/aaa/aaa.html | INSIDE COMPANY | HIGH | HANDLE WITH CARE | INTERNAL USE ONLY | GENERAL | TOP-SECRET MATERIAL | TOP-SECRET MATERIAL | TOP-SECRET MATERIAL |
| 2 | http://www.xxx.co.jp/bbb/bbb.pdf | INSIDE COMPANY | MIDDLE | · | HANDLE WITH CARE | TOP-SECRET MATERIAL | TOP-SECRET MATERIAL | TOP-SECRET MATERIAL | TOP-SECRET MATERIAL |
| 3 | http://www.xxx.co.jp/ccc/ccc.pdf | INSIDE COMPANY | LOW | | | PRINT INHIBITED | HANDLE WITH CARE | HANDLE WITH CARE | TOP-SECRET MATERIAL |
| | | | | | | HANDLE WITH CARE | HANDLE WITH CARE | HANDLE WITH CARE | |
| 4 | http://www.XYZ.co.jp | OUTSIDE COMPANY | NONE | · | · | | | · | |

# IMAGE FORMING APPARATUS AND INFORMATION PROCESSING METHOD

BACKGROUND OF THE INVENTION

1. Field of the Invention

The present invention relates to a processing technique of printing an object displayed by the browser function of an image forming apparatus.

2. Description of the Related Art

Digital copying machine-based multifunctional image forming apparatuses with many functions have recently come into practical use. The multifunctional image forming apparatus has the copy function, facsimile function, printer function, and scanner function. In addition, the multifunctional image forming apparatus has a function of saving image data obtained by scanning in a hard disk or the like, and a Web browser function of browsing a Web page (see, e.g., Japanese Patent Laid-Open No. 2003-122279).

To operate these functions, the operation panel of the multifunctional image forming apparatus has become large in recent years. Along with this, the operation panel serves not only as an operation setting device to execute the functions, but also as a display device to monitor, for example, the operation and status of a remote device on the network. In the use of the Web browser function, the operation panel also serves as a Web page display device.

The combination of the Web browser function and printer function allows a user to easily print a Web page currently displayed on the operation panel by merely pressing the start button.

These days, leakage of highly confidential information has surfaced as a social issue, and security is getting a growing interest. Information leakage occurs in various situations. For example, in the case of the above-mentioned multifunctional image forming apparatus, information may leak from a material which is printed by the multifunctional image forming apparatus (e.g., a material printed using the Web browser function) and left unrecovered.

Particularly when many unspecified users share the multifunctional image forming apparatus, a user may forget to retrieve a printed material after designating printing from a remote location. The printout material is left unrecovered, leaking information.

To prevent information leakage in this case, for example, there is proposed a mechanism of saving print data once in a hard disk or the like in the multifunctional image forming apparatus, and when the user inputs a password in front of the apparatus, printing is started in front of the user. There is also proposed an arrangement of transmitting mail to a user who has designated printing after the end of printing.

From the viewpoint of preventing information leakage, the multifunctional image forming apparatus takes various measures against forgetting to retrieve a printed material, and prevents a printed material from being left unrecovered for a long time.

However, to prevent information leakage, the above-described method forces a user of this mechanism to perform special work to, for example, designate saving of print data in the hard disk. It is desirable to avoid information leakage in printing without any such special work by the user.

The above-described method cannot prevent a printed material from being left unrecovered for a long time when the user forgets settings. Many people who pass by the multifunctional image forming apparatus may see a highly confidential printed material. It is desired to avoid widespread information leakage as much as possible even when a printed material is left unrecovered.

SUMMARY OF THE INVENTION

The present invention has been made to overcome the conventional drawbacks, and achieves to prevent information leakage in printing as much as possible without increasing the workload of the user when a material printed by an image forming apparatus is left unrecovered.

An image forming apparatus according to the present invention comprises the following arrangement. That is, an image forming apparatus capable of visibly outputting an object stored in a server apparatus, comprising:

a search unit configured to, when an instruction to designate an object is input, search a storage unit which stores information representing confidentiality of the object and a storage location of the object in advance in correspondence with each other;

a read unit configured to read out, from the storage unit based on a result of search by the search unit, information which corresponds to the storage location of the instruction-input object and represents the confidentiality of the object; and an output unit configured to visibly output, together with the object, the information which is read out by the read unit and represents the confidentiality of the object.

The present invention can prevent information leakage in printing as much as possible without increasing the workload of the user when a material printed by an image forming apparatus is left unrecovered.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a view showing the outer appearance of an operation unit 293;

FIG. 12 is a table showing an example of a URL table stored in the MFP according to the second embodiment of the present invention;

FIG. 13 is a view showing an example of a Web browser display window;

FIG. 14 is a table showing an example of a URL table stored in the MFP according to the third embodiment of the present invention;

FIGS. 15A to 15C are tables showing examples of URL tables stored in the MFP and the like according to the fourth embodiment of the present invention;

FIG. 16 is a table showing an example of a URL table stored in the MFP according to the fifth embodiment of the present invention; and FIG. 17 is a table showing another example of the URL table stored in the MFP according to the fifth embodiment of the present invention.

DESCRIPTION OF THE EMBODIMENTS

Preferred embodiments of the present invention will now be described in detail in accordance with the accompanying drawings.

[First Embodiment]

<1. Network Configuration View>

Figure 1:
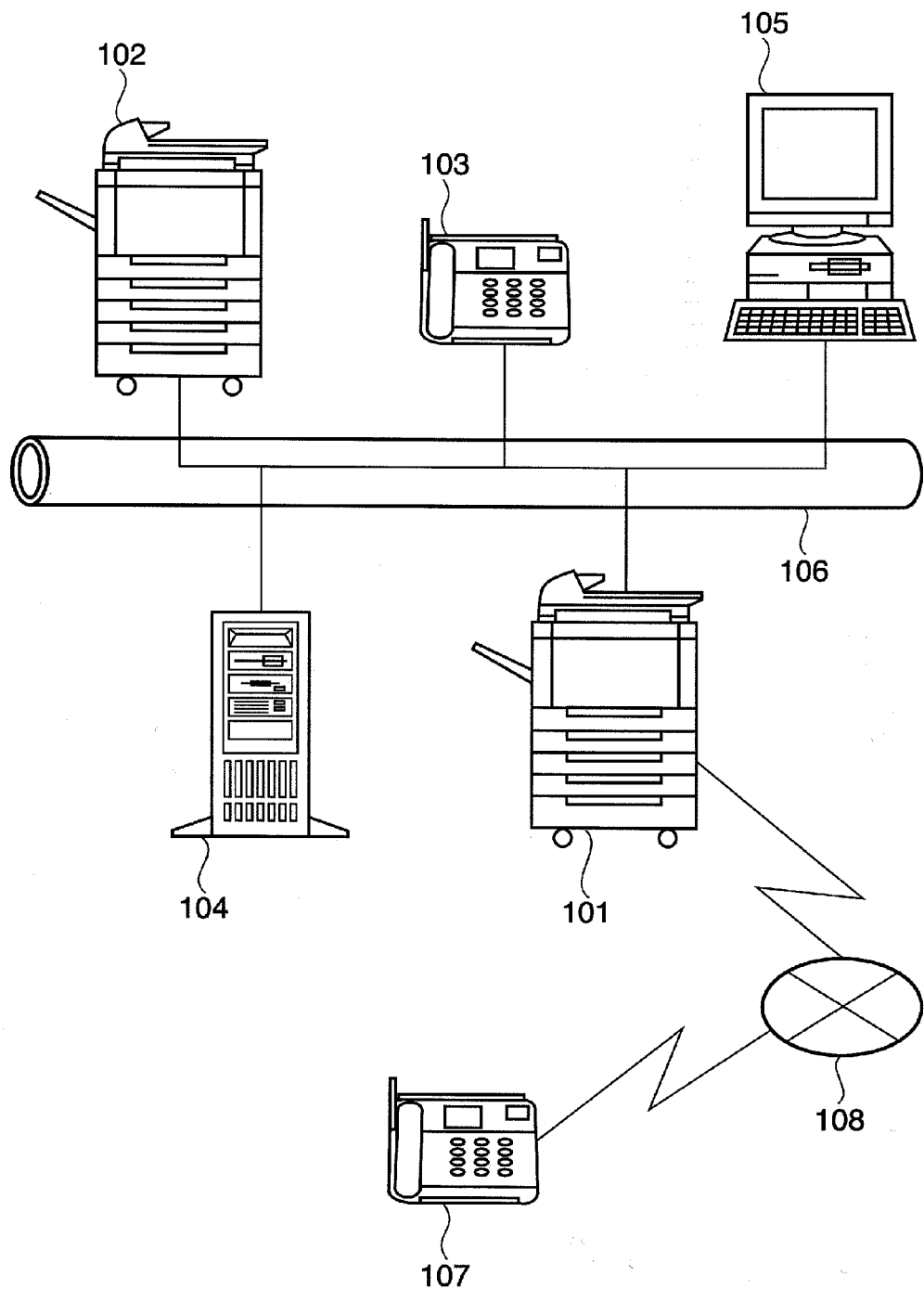
FIG. 1 is a view showing an example of a network configuration having an image forming apparatus according to an embodiment of the present invention.

FIG. 1 is a view showing an example of a network configuration having an image forming apparatus according to the embodiment of the present invention. The first embodiment will be described using a multifunctional image forming apparatus "MFP" (Multi Function Peripheral) as an example of the image forming apparatus.

An MFP 101 is available by connecting it to a LAN 106 of Ethernet® or the like together with an MFP 102 having the same functions as those of the MFP 101, a facsimile apparatus 103, a database/mail server 104, and a client computer 105. The MFP 101 is also available by connecting it to a public line 108 together with a facsimile apparatus 107.

The MFP 101 has the copy function and facsimile function, and also has a network function of reading a document image and transmitting the read image data to each apparatus on the LAN 106. The MFP 101 also has a PDL function, and can print a designated PDL image by receiving it from the client computer 105 or the like connected to the LAN 106.

Further, the MFP 101 has a Web browser function of accessing a Web server (not shown) on the LAN 106, a Web server (not shown) connected via the public line 108, or a Web server (not shown) connected to the Internet (not shown) connected to the LAN 106, and displaying various objects such as Web pages held in the Web server or Web contents provided by the Web server.

The facsimile apparatus 103 can receive data read by the MFP 101 via the LAN 106 to transmit the received data. The database/mail server 104 can receive data read by the MFP 101 via the LAN 106 to store it in the database and send it by e-mail.

The client computer 105 can connect to the database/mail server 104 to acquire desired data from the database/mail server 104 and display it. The client computer 105 can output a PDL image print instruction to the MFP 101. Also, the client computer 105 can receive data read by the MFP 101 via the LAN 106 to process and edit the received data.

The facsimile apparatus 107 can receive data read by the MFP 101 via the public line 108 to print out the received data.

<2. Block Diagram of Arrangement of Main Part of MPP 101>

Figure 2:
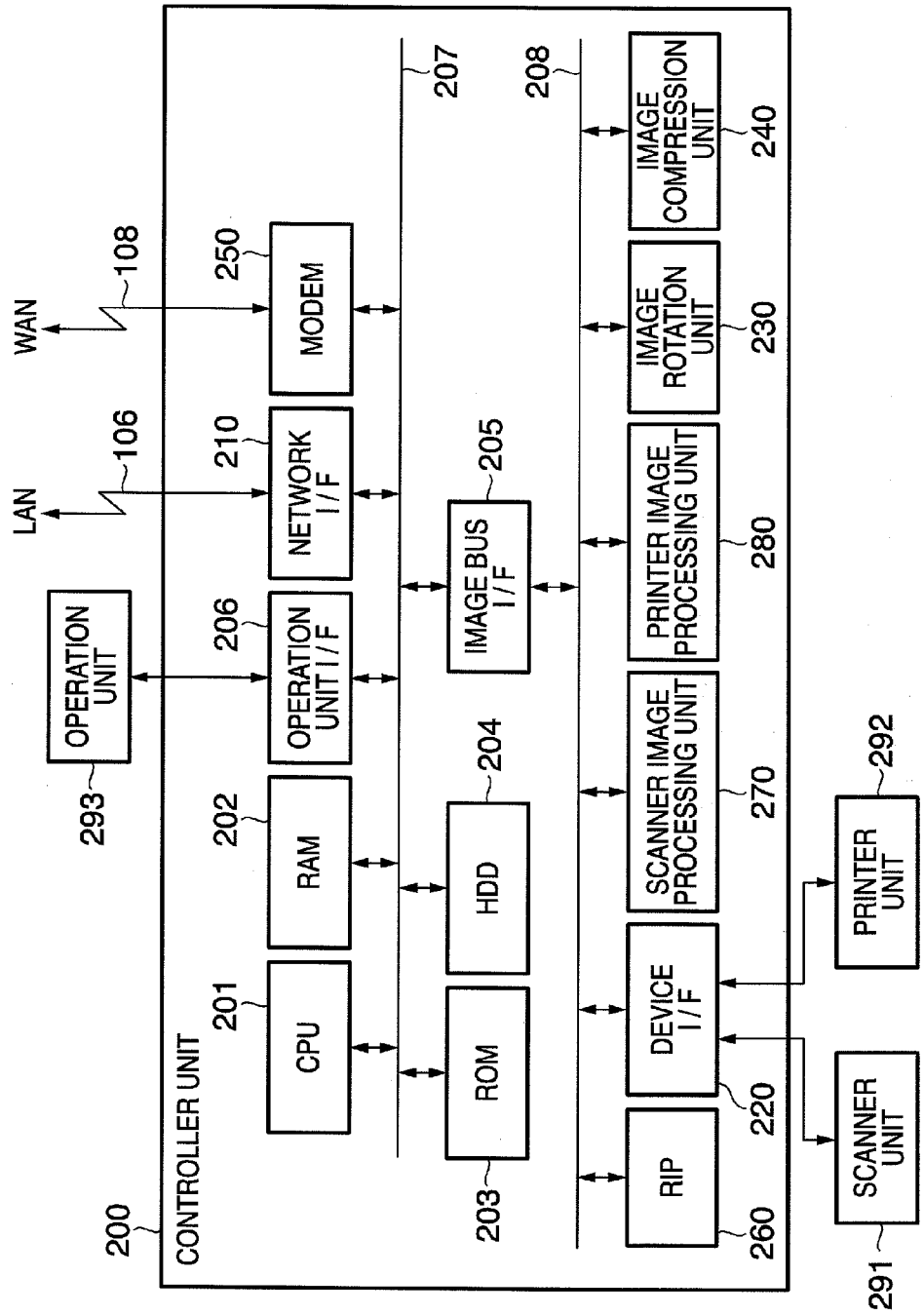
FIG. 2 is a block diagram showing the arrangement of the main part of an NFP 101.

FIG. 2 is a block diagram showing the arrangement of the main part of the MFP 101. In FIG. 2, a controller unit 200 is connected to a scanner unit 291 serving as an image input device, and a printer unit 292 serving as an image output device. The controller unit 200 controls to implement a copy function of printing out image data scanned by the scanner unit 291 from the printer unit 292. The controller unit 200 connects to the LAN 106 and public line 108 (WAN), and controls input/output of image information and device information.

More specifically, the controller unit 200 comprises a CPU 201. The CPU 201 boots an operating system (OS) in accordance with a boot program stored in a ROM 203. The CPU 201 executes various processes by executing application programs stored in an HDD (Hard Disk Drive) 204 on the OS. The application programs include a program to implement the copy function, and programs to implement the send/FAX function, box function, and Web browser function. The application programs also include a program to implement a network function of externally transmitting/receiving data.

A RAM 202 serves as the work area of the CPU 201. In addition to the work area, the RAM 202 also provides an image memory area to temporarily store image data. The HDD 204 stores the application programs, image data, and a URL table (to be described later).

The CPU 201 is connected via a system bus 207 to the ROM 203, the RAM 202, an operation unit I/F (operation unit interface) 206, and a network I/F (network interface) 210. The CPU 201 is also connected to a modem 250 and image bus I/F (image bus interface) 205.

The operation unit I/F 206 interfaces an operation unit 293 having a touch panel, and outputs image data to the operation unit 293 to display the data. The operation unit I/F 206 sends information input from the user via the operation unit 293 to the CPU 201.

The network I/F 210 connects to the LAN 106 to input/output information to/from each apparatus on the LAN 106 via the LAN 106. The modem 250 connects to the public line 108 to input/output information via the public line 108.

The image bus I/F 205 is a bus bridge which connects the system bus 207 and an image bus 208 for transferring image data at high speed, and converts the data structure. The image bus 208 is a PCI bus or IEEE1394 bus. A raster image processor (to be referred to as an RIP hereinafter) 260, device I/F 220, scanner image processing unit 270, printer image processing unit 280, image rotation unit 230, and image compression unit 240 are connected to the image bus 208.

The RIP 260 is a processor which rasterizes a PDL code into a bitmap image. The device I/F 220 connects the scanner unit 291 and printer unit 292. The device I/F 220 performs synchronous/asynchronous conversion of image data. The scanner image processing unit 270 corrects, processes, and edits input image data. The printer image processing unit 280 executes printer correction, resolution conversion, and the like for printout image data.

The image rotation unit 230 rotates image data. The image compression unit 240 compresses multilevel image data into JPEG data and binary image data into JBIG, MMR, or MH data, and decompresses image data.

<3. Hardware Configuration of MFP 101>

Figure 3:
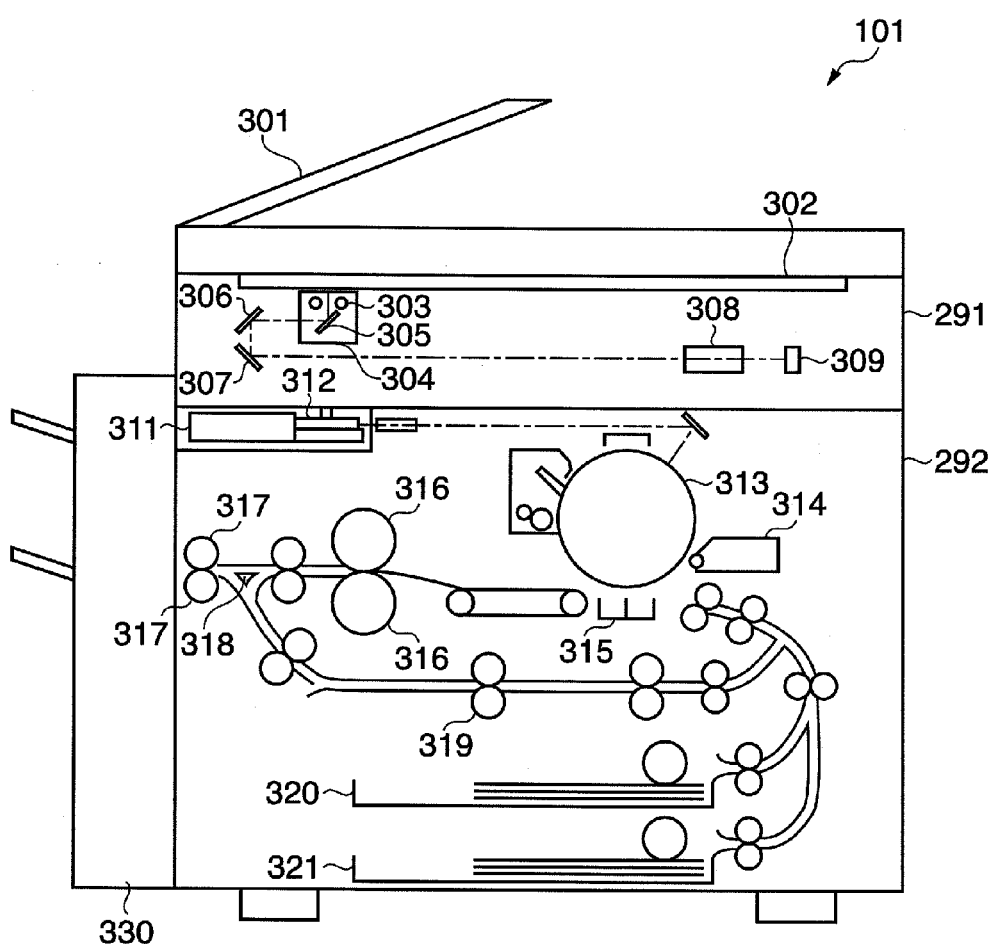
FIG. 3 is a view schematically showing the hardware configurations of a scanner unit 291 and printer unit 292 of the MFP 101.

FIG. 3 is a view schematically showing the hardware configurations of the scanner unit 291 and printer unit 292 of the MFP 101 in FIG. 1.

As shown in FIG. 3, the scanner unit 291 and printer unit 292 are integrated. The scanner unit 291 comprises a document feed unit 301. The document feed unit 301 feeds document sheets one by one from the first sheet onto a platen glass 302, and every time each document sheet is read, discharges it from the platen glass 302 to a discharge tray (not shown).

When a document sheet is fed onto the platen glass 302, the scanner unit 291 turns on a lamp 303 and starts moving a moving unit 304. As the moving unit 304 moves, the document sheet on the platen glass 302 is scanned and read. During read scanning, light reflected by the document sheet is guided to a CCD image sensor (to be referred to as a CCD hereinafter) 309 via mirrors 305, 306, and 307 and a lens 308, forming an image on the document sheet onto the image sensing plane of the CCD 309. The CCD 309 converts the image formed on the image sensing plane into an electrical signal, which undergoes a predetermined process and is input to the controller unit 200 (not shown in FIG. 3).

The printer unit 292 comprises a laser driver 311. The laser driver 311 drives a laser-emitting unit 312 based on image data input from the controller unit 200. The laser-emitting unit 312 emits a laser beam corresponding to the image data, and the laser beam scans and irradiates a photosensitive drum 313.

The laser beam irradiation forms an electrostatic latent image on the photosensitive drum 313, and the electrostatic latent image is visualized into a toner image with toner supplied from a developing unit 314. In synchronism with the laser beam irradiation timing, a print sheet is fed between the photosensitive drum 313 and a transfer unit 315 from a cassette 320 or 321 via the conveyance path. The transfer unit 315 transfers the toner image on the photosensitive drum 313 onto the fed print sheet.

The print sheet bearing the toner image is sent to a pair of fixing rollers (heat roller and press roller) 316 via a conveyer belt. The pair of fixing rollers 316 thermally press the print sheet to fix the toner image on the print sheet onto it. The print sheet having passed through the pair of fixing rollers 316 is delivered to a delivery unit 330 via a pair of delivery rollers 317. The delivery unit 330 is formed from a sheet processing device capable of performing post-processes such as sorting and stapling. When the double-sided print mode is set, the print sheet is conveyed to the pair of delivery rollers 317, and the rotational direction of the pair of delivery rollers 317 is reversed to guide the print sheet to a refeed conveyance path 319 via a flapper 318. The print sheet guided to the refeed conveyance path 319 is fed again between the photosensitive drum 313 and the transfer unit 315 at the above-described timing. Then, a toner image is transferred onto the reverse surface of the print sheet.

<4. Outer Appearance of Operation Unit of MFP 101>

FIG. 4 shows the outer appearance of the operation unit 293. An LCD display 401 is covered with a touch panel sheet on the LCD, and displays a system operation window. When the user touches a displayed key, the LCD display 401 notifies the CPU 201 of the controller unit 200 of position information of the key.

A start key 405 is used to start scanning a document image via the scanner unit 291. An LED 406 in two colors, green and red, is arranged at the center of the start key 405, and the color of the LED 406 represents whether the start key 405 is available. A stop key 404 stops an operation in progress. An ID key 403 is used to input the user ID of a user. A user mode key 402 is used to set a user mode via the operation window displayed on the LCD display 401.

<5. Window of Operation Unit 293>

Figure 5:
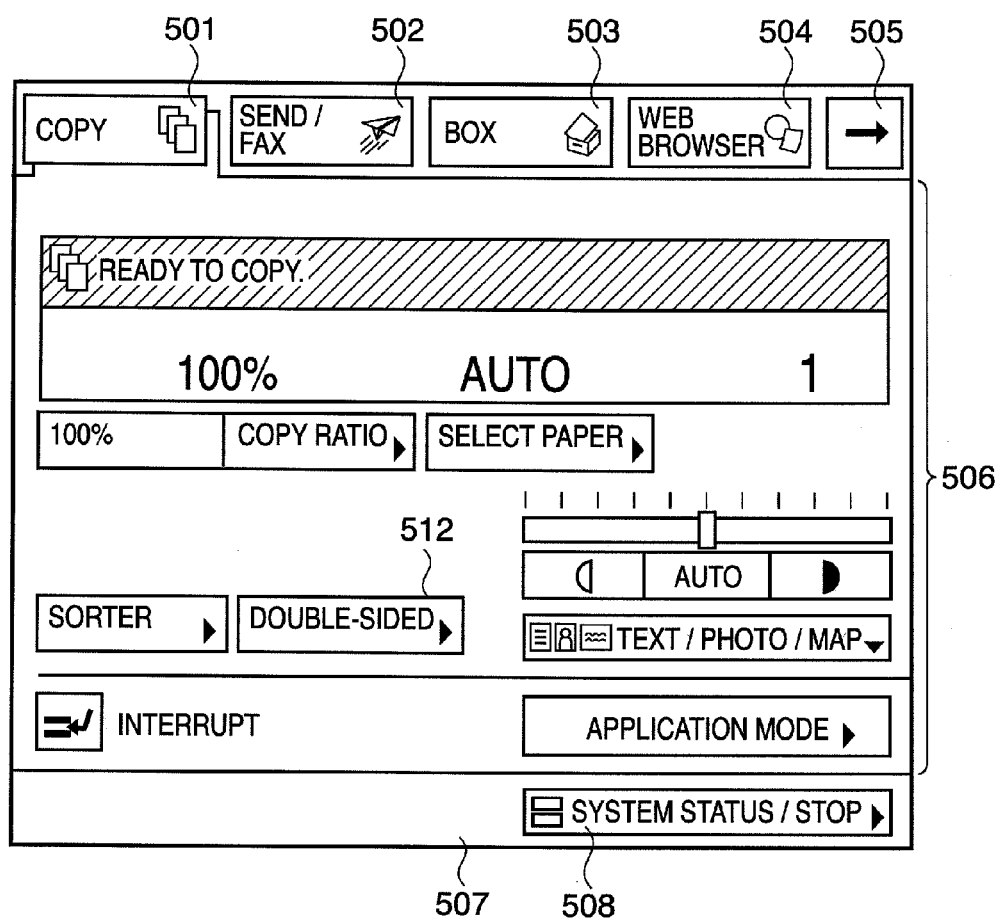
FIG. 5 is a view showing an example of an operation window displayed on an LCD display 401 of the operation unit 293.

FIG. 5 is a view showing an example of an operation window displayed on the LCD display 401 of the operation unit 293.

As shown in FIG. 5, the upper portion of the operation window displays touch keys on tabs for a plurality of functions such as a copy key 501, send/FAX key 502, box key 503, and Web browser key 504.

FIG. 5 illustrates the initial window of the copy function displayed when the user touches the copy key 501. As shown in FIG. 5, an upper portion in an initial window 506 of the copy function displays a status message ("ready to copy.") that the copy function is executable. The copy ratio, selected feed stage, and input entry are displayed below the message.

As touch keys for setting the operation mode of the copy function, an equal-magnification key, copy ratio key, paper selection key, sorter key, double-sided key, interrupt key, and text/photo/map key are displayed. A left arrow key to decrease density, a right arrow key to increase density, and an "auto" key to automatically adjust density are displayed for density adjustment. To designate operation modes which cannot be displayed in the initial window, setup windows are hierarchically displayed in the window by touching an application mode key.

A display area 507 displays the status of the MFP 101, and displays, for example, an alarm message for jam or the like, and a status message that PDL printing is in progress when the MFP 101 executes PDL printing.

Reference numeral 508 denotes a system status/stop key. The user touches the system status/stop key 508 to display a window for displaying device information of the MFP 101 or a window (not shown) for displaying a print job status. The user can stop a job via the window.

When the user touches the send/FAX key 502, a setup window (not shown) for transmitting an image scanned via the scanner 291 to a device (e.g., facsimile apparatus 103) on the LAN 106 by e-mail, or FTP-transmitting the image is displayed. This setup window also allows the user to transmit a scanned image to the facsimile apparatus 107 via the public line 108.

When the user touches the box key 503, a setup window (not shown) is displayed. This setup window allows the user to make settings to save (register) an image read by the MFP 101 in the box area of the HDD 204, designate and print image data saved in the box area, or transmit image data to a device on the LAN 106.

When the user touches the Web browser key 504, a Web browser window is displayed, and the user can browse Web pages. Details of the Web browser window will be described.

When the controller unit 200 has five or more functions, a right arrow key 505 is displayed on the right side of the four, copy, send/FAX, box, and Web browser function keys.

<6. Description of Web Browser Window>

Figure 6:
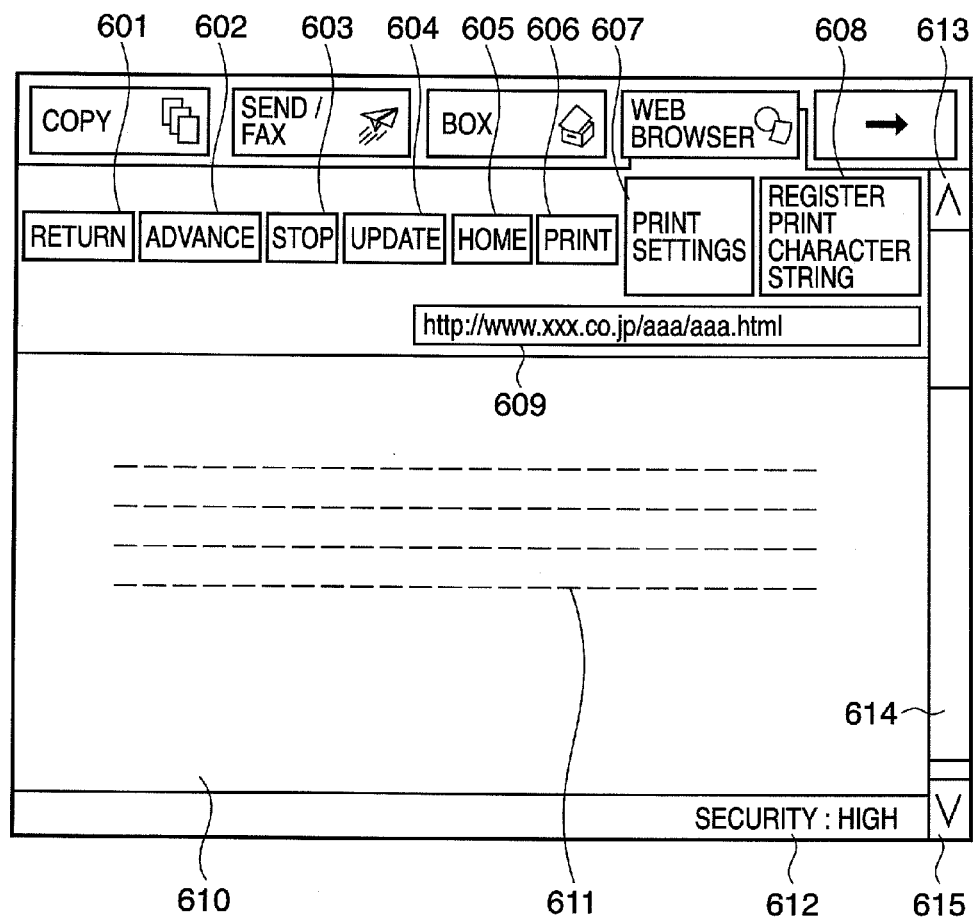
FIG. 6 is a view showing an example of a Web browser window displayed by touching a Web browser key 504.

FIG. 6 shows an example of a Web browser window displayed by touching the Web browser key 504. Details of the Web browser window shown in FIG. 6 will be explained.

Reference numeral 609 denotes a URL input field. The user touches the URL input field 609 when designating a URL and opening a Web page. The user touches the URL input field 609 to display a soft keyboard (not shown), and can designate a URL.

Reference numeral 601 denotes a return key to return a Web page by one. Reference numeral 602 denotes an advance key to advance a Web page by one. Reference numeral 604 denotes an update key to load and display a currently displayed Web page again. Reference numeral 603 denotes a stop key to stop loading a Web page. Reference numeral 605 denotes a home key to move to the Web page of a preset URL.

Reference numeral 610 denotes a display area to display a loaded Web page. Reference numeral 611 denotes an example of a Web page displayed in the display area 610. In this example, a text in a Web page typified by HTML is displayed. Reference numeral 614 denotes a scroll bar to scroll the display area 610. Reference numeral 613 denotes a button to scroll up the display area 610, and reference numeral 615 denotes a button to scroll down the display area 610.

Reference numeral 606 denotes a print key. When the user touches the print key 606, printing of a Web page displayed at present in the display area 610 starts. Reference numeral 607 denotes a print setting key. The user touches the print setting key to display a print setup window, and can set various print conditions for printing a Web page. Reference numeral 608 denotes a print character string registration key used to register information representing the confidentiality of a displayed Web page in advance in a URL table in correspondence with the URL.

Figure 7:
FIG. 7 is a table showing an example of a URL table when the user touches a print character string registration key 608 to register information representing the confidentiality of a Web page in correspondence with the URL.

FIG. 7 is a table showing an example of the URL table when the user touches the print character string registration key to register information representing the confidentiality of a Web page in correspondence with the URL. The HDD 204 stores the URL table shown in FIG. 7.

In FIG. 7, reference numeral 701 denotes an area where a URL representing the storage location of a Web page is registered. Reference numeral 702 denotes an area where information ("security level" in the first embodiment) representing the confidentiality of the Web page having the URL registered in the area 701 is registered.

Referring back to FIG. 6, reference numeral 612 denotes an area where information representing the confidentiality of a Web page displayed in the display area 610 is displayed based on the URL table. "Security: high" is displayed in the example of FIG. 6. The URL table may be set for each Web page, each Web site, or each specific directory within a single Web site.

<7. Sequence of Display/Print Process with Web Browser Function>

Figure 8:
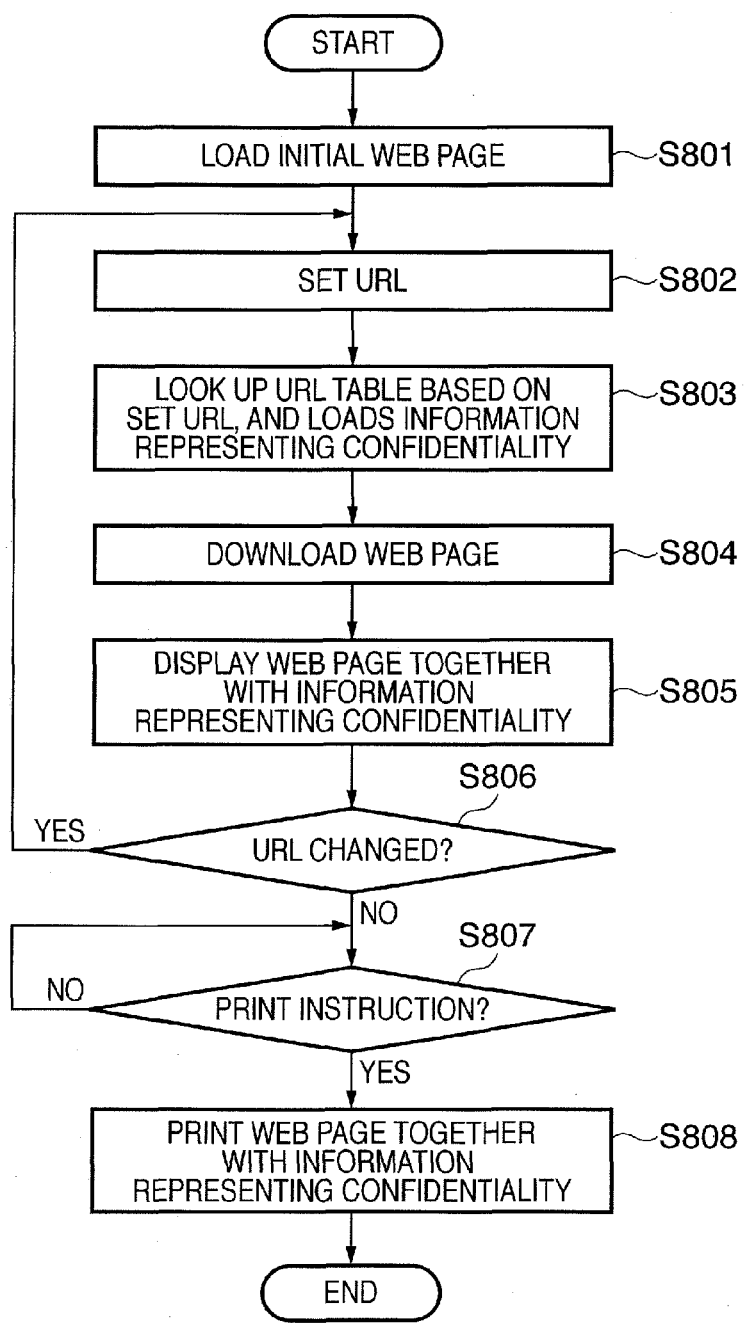
FIG. 8 is a flowchart showing the sequence of a display/print process with the Web browser function of the MFP according to the first embodiment of the present invention.

The sequence of a display/print process with the Web browser function of the MFP 101 according to the first embodiment will be described with reference to FIG. 8. FIG. 8 is a flowchart showing the sequence of the display/print process with the Web browser function of the MFP 101 according to the first embodiment. This sequence starts when the user touches the Web browser key 504 in FIG. 5 to display the Web page display window in FIG. 6.

In step S801, the CPU 201 loads an initial Web page URL saved in the HDD 204. In step S802, the CPU 201 stores the loaded URL in the RAM 202.

In step S803, the CPU 201 looks up the URL table shown in FIG. 7 based on the URL set in the RAM 202, reads out the information (security level) 702 representing the confidentiality of the Web page of the URL, and stores it in the RAM 202.

In step S804, the CPU 201 downloads a Web page from the set URL. In step S805, the CPU 201 displays the downloaded Web page in the display area 610 using the Web browser function. At this time, the CPU 201 displays, in the security level display area 612, the information (security level) which has been read out in step S803 and represents the confidentiality of the Web page.

In step S806, the CPU 201 determines whether the user has input a URL to the URL input field 609 and touched the update key 604 (whether the URL has changed). If the CPU 201 determines in step S806 that the URL has changed, the process returns to step S805. In this case, the CPU 201 sets a new URL in the RAM 202 in step S805. "URL change" in step S806 also includes a case where the user designates a hyperlink embedded in the Web page displayed in step S805 to change the URL to one indicated by the designated hyperlink.

If the CPU 201 determines that no URL has changed, the process advances to step SS07. In step S807, the CPU 201 waits for the touch of the print key 606. If the CPU 201 determines that the user has touched the print key 606, the process advances to step S808.

In step S808, the CPU 201 prints the Web page displayed in the display area 610 and information representing the confidentiality of the Web page.

Figure 9:
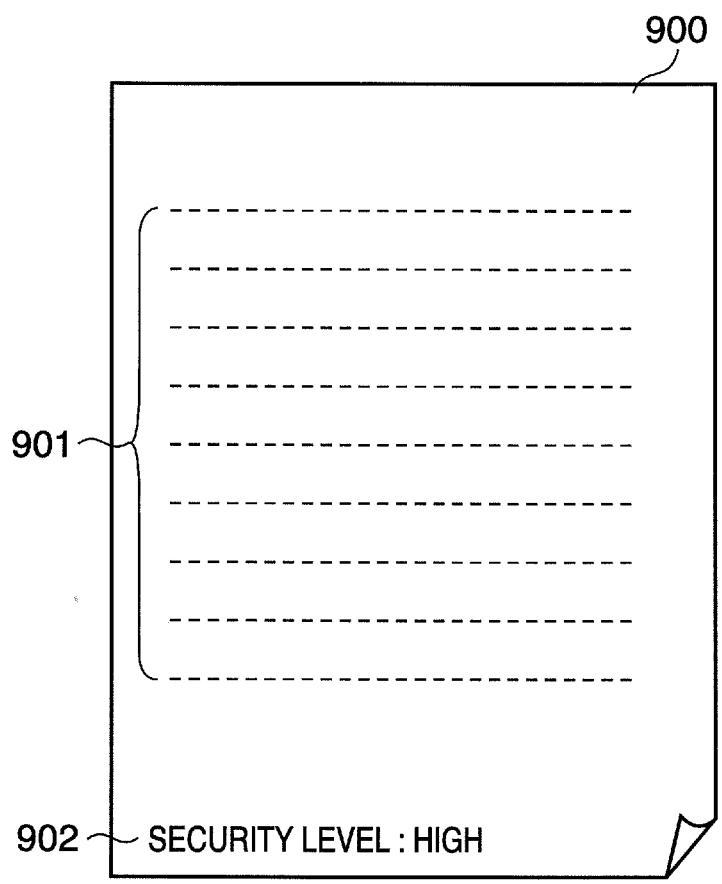
FIG. 9 is a view showing an example of a result printed by the MFP according to the first embodiment of the present invention.

FIG. 9 is a view showing an example of the print result in step S808. As shown in FIG. 9, a Web page is printed at a center portion 901 of a print result 900, and information (security level: high) representing the confidentiality of the Web page is printed at a lower portion 902.

It is also possible to print without adding information representing the confidentiality of a Web page when the security level 702 in the URL table of FIG. 7 is "low".

When the security level 702 in the URL table of FIG. 7 is "none", the LCD display 401 may display a warning that no security level is set, before printing a Web page in step S808. In this case, after recognizing that no security level is set, the user may continue printing the Web page, or may set the security level for the Web page before printing. The Web page may be printed by adding the contents of the security level set before printing. Further, the setting may be reflected in the security level 702 in the URL table of FIG. 7.

In the flowchart of FIG. 8, a Web page is printed in accordance with a print instruction after displaying the Web page based on a set URL. Alternatively, the Web page may be printed without displaying it based on URL designation. Even in this case, the Web page is printed by adding information representing its confidentiality.

As is apparent from the above description, when displaying and printing a Web page, the first embodiment can automatically display and print information representing the confidentiality of the Web page by registering the information in advance for each Web page URL. In this case, the workload on the user in printing does not increase.

A material printed via the MFP 101 bears information representing confidentiality. Even if the user leaves the printed material unrecovered for a predetermined time, this information prompts a third party to properly deal with the printed material. This can prevent widespread information leakage caused by leaving a printed material unrecovered.

[Second Embodiment]

In the first embodiment, many unspecified users can freely use the Web browser function. However, the present invention is not limited to this, and may oblige a user to input a user name and password when using the Web browser function.

Since a user is specifiable by inputting the user name, information representing confidentiality may change depending on the user. Details of the second embodiment will be described.

<1. Description of Login Window>

Figure 10:
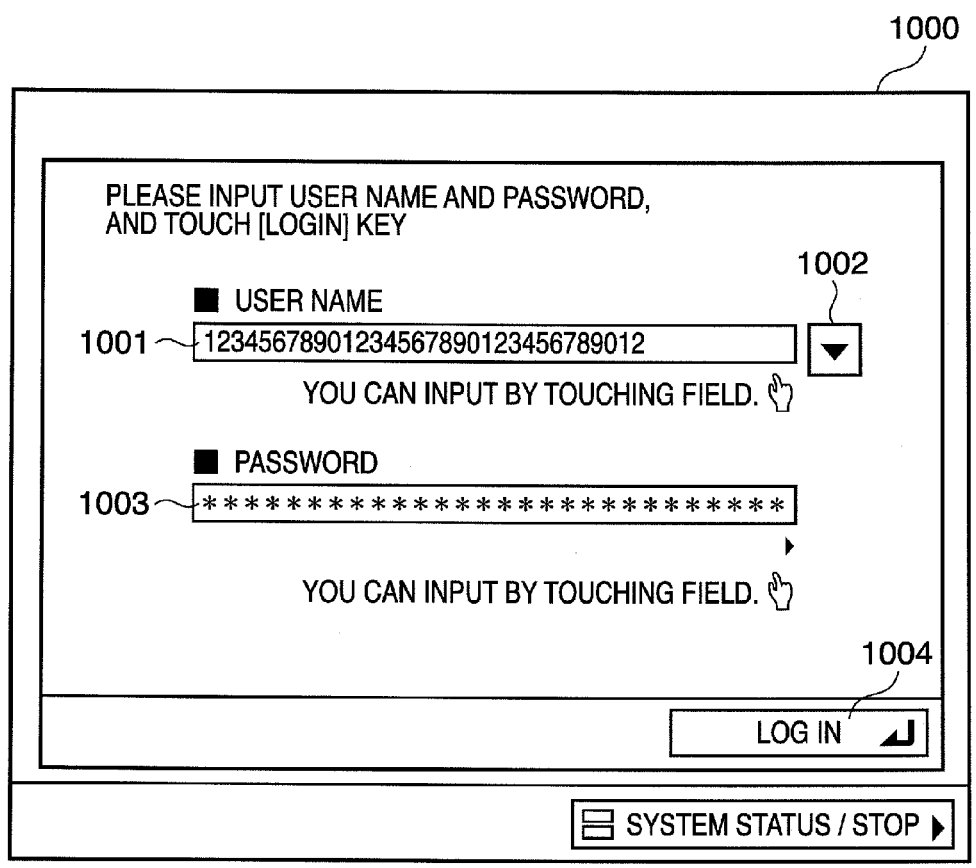
FIG. 10 is a view showing an example of a login window displayed when using the Web browser function.

FIG. 10 is a view showing an example of a login window 1000 displayed when using the Web browser function (i.e., when touching a Web browser key 504).

In FIG. 10, reference numeral 1001 denotes a user name input field, and reference numeral 1002 denotes a pull-down key. When inputting a user name, the user can select a predetermined user name from a user name list displayed by touching the pull-down key 1002.

Reference numeral 1003 denotes a password input field where the user inputs a password corresponding to the user name input in the user name input field 1001. Reference numeral 1004 denotes a login key. The user touches the login key 1004 after inputting the user name and password. Then, it is checked whether the user name and password are input correctly. If it is determined that the user name and password are input correctly, the login window 1000 shifts to the Web browser window shown in FIG. 6. If it is determined that the user name and password are not input correctly, a message to this effect is displayed.

<2. User Attribute Table>

Figure 11:
FIG. 11 is a table showing an example of a user attribute table registered in advance in the MFP according to the second embodiment of the present invention.

FIG. 11 is a table showing an example of a user attribute table registered in advance in an MFP 101. The user attribute table represents the correspondence between a user name input in the login window and a user attribute (in this example, "title" of the user).

Reference numeral 1101 denotes an area where a user name is stored, and reference numeral 1102 denotes an area where an attribute is stored. The user attribute is specifiable by looking up the user attribute table (FIG. 11).

<3. URL Table>

FIG. 12 shows an example of the URL table according to the second embodiment. The same reference numerals as those of the URL table (FIG. 7) described in the first embodiment denote the same areas.

The URL table in FIG. 12 is different from that in FIG. 7 in a registered phrase area 1201. As described above, the MFP 101 according to the second embodiment requires input of a user name and password when using the Web browser function. With the user name and password, the MFP 101 according to the second embodiment can specify a user who currently uses the Web browser function. By looking up the user attribute table shown in FIG. 11, the MFP 101 can specify the attribute of the user who currently uses the Web browser function.

After the URL is set, a registered phrase (information representing the confidentiality of a Web page) corresponding to the user attribute is loadable in step S803 of FIG. 8 by looking up the URL table shown in FIG. 12.

For example, when the user name=kimura, the attribute corresponding to the user name is "general". When http://www.XXX.co.jp/aaa/aaa.html is set as the URL, "top-secret material" is loaded as a registered phrase.

<4. Web Browser Display Window>

FIG. 13 is a view showing an example of a Web browser window on the MFP 101 according to the second embodiment. The same reference numerals as those of the Web browser display window (FIG. 6) on the MFP according to the first embodiment denote the same parts.

The Web browser display window in FIG. 13 is different from that in FIG. 6 in that a print character display area 1301 displays a phrase registered in the URL table of FIG. 12, and a login user name display area 1302 displays a user name.

In FIG. 13, when the user touches a print key 606, information representing various types of confidentiality is printed together with a Web page displayed in a display area 610. More specifically, the registered phrase ("top-secret material") displayed in the print character display area 1301, and security level ("high") displayed in a security level display area 612 are printed. The user name ("kimura") displayed in the login user name display area 1302 may also be printed in addition to the information representing confidentiality.

For example, when a general user sets a ORL "http://www.XXX.co.jp/ccc/ccc.pdf", a phrase "print inhibited" is loaded by referring to the registered phrase area 1201 of the URL table in FIG. 12. In this case, "print inhibited" may be displayed in the print character display area 1301 of the Web browser display window in FIG. 13, and printing of the Web page may be inhibited. Printing of the Web page may be inhibited by deleting the display of the print key 606 and print setting key 607, or graying out the display to reject acceptance of key touch. After accepting the touch of the print key 606, a warning that printing of the Web page is inhibited may be displayed.

As is apparent from the above description, the second embodiment registers a phrase as information representing confidentiality together with the security level. The registered phrase is also displayable and printable when displaying and printing a Web page.

A login user name in the use of the Web browser function, and an attribute corresponding to the user name are stored in correspondence with each other, and a phrase is registered for each attribute. This arrangement can display and print information corresponding to the situation as information representing the confidentiality of a Web page.

A login user name is also printed. Even if the user leaves a printed material unrecovered for a predetermined time, a third party can grasp that the user has printed the material. This arrangement can prompt a third party to properly deal with the printed material.

In the above description, the login window 1000 is displayed when using the Web browser function (when touching the Web browser key 504), and a user name and password input to the login window 1000 are utilized. However, the present invention is not limited to this, and may use, for example, an ID input by operating an ID key 403 in activating the MFP 101.

[Third Embodiment]

In the second embodiment, security level and a phrase are separately registered as information representing the confidentiality of a Web page. However, the present invention is not limited to this, and may automatically register a phrase based on the storage location and security level of a Web page.

FIG. 14 is a table showing an example of the URL table of an MFP 101 according to the third embodiment. The same reference numerals as those of the URL table in the second embodiment denote the same areas.

The URL table in FIG. 14 is different from that in FIG. 12 in a contents storage location area 1401. The contents storage location indicates a category such as "inside company" or "outside company".

In the example of FIG. 14, the storage location of a Web page of a URL "http://www.XXX.co.jp/aaa/aaa.html" is inside the company, so the user registers "inside company" in the contents storage location area 1401. Assume that the user registers security level "high". The Web page with storage location "inside company" and security level "high" is printed as a highly confidential material. For the attribute="department manager", a phrase "handle with care" is automatically registered. For the attribute="section chief", a phrase "internal use only" is automatically registered. For the attribute="general", a phrase "top-secret material" is automatically registered.

The storage location of a Web page of a URL "http://www.XYZ.co.jp" is outside the company, so the user registers "outside company" in the contents storage location area 1401. Assume that the user registers security level "none". The Web page with storage location "outside company" and security level "none" is printed as a non-confidential material. Thus, no phrase is registered.

In this manner, a phrase optimum for the storage location and security level of a Web page is automatically registered for each user attribute. This arrangement can display and print information corresponding to the situation as information representing the confidentiality of a Web page. The user need not input a registered phrase, improving user friendliness.

The third embodiment automatically registers a phrase by registering the storage location and security level of contents by the user. However, the present invention is not limited to this. For example, it is also possible to automatically determine, based on the URL, whether the storage location of contents is "inside company" or "outside company", and automatically register a phrase based on the determination result and security level registered by the user. In this case, it suffices for the user to register only the security level, improving user friendliness. URL-based determination of whether the storage location of contents is "inside company" or "outside company" is achieved by determining whether the domain described in the URL is an in-house domain.

[Fourth Embodiment]

The above embodiments have described the URL table stored in the MFP 101, but the apparatus which stores the URL table is not limited to the MFP 101. The same effects can also be obtained by similarly storing the URL table in another MFP, facsimile apparatus, or the like on the network.

At this time, the contents of the URL table may change in accordance with the installation location of the apparatus which stores the URL table. This is because the possibility of information leakage changes depending on where the apparatus is installed.

FIGS. 15A, 15B, and 15C are tables showing examples of URL tables stored in an MFP 101, MFP 102, and facsimile apparatus 107, respectively. Similar to the MFP 101, the MFP 102 and facsimile apparatus 107 also have the Web browser function described in the first embodiment.

Assume that the MFP 101 is installed in the office in the company, the MFP 102 is installed in a meeting room in the company, and the facsimile apparatus 107 is installed outside the company. A material printed by the facsimile apparatus 107 is most likely to be seen by a third party outside the company. A material printed by the MFP 102 is second most likely to be seen. Even for a Web page of the same URL, the URL table according to the fourth embodiment can change a registered phrase between apparatuses at different installation locations.

In this case, the security of the installation location can be determined by determining whether the domain of the installed MFP or facsimile apparatus is inside or outside the company, and even if the domain is inside the company, whether many third parties go into and out of the installation location. A URL table having proper registered phrases is automatically settable by determining, in accordance with the security of the installation location, which of the tables in FIGS. 15A, 15B, and 15C is applied.

As is apparent from the above description, the fourth embodiment can change a registered phrase for each apparatus in consideration of the fact that, even for a Web page of the same URL, the possibility of information leakage changes depending on the installation location of an apparatus which is to print the Web page. This arrangement can print a registered phrase corresponding to the possibility of information leakage.

[Fifth Embodiment]

The above embodiments have not especially referred to the character size and print position of a registered phrase. For example, the character size and print position of a registered phrase may arbitrarily change in display and printing.

FIG. 16 is a table showing an example of a URL table stored in an MFP 101 according to the fifth embodiment. The URL table shown in FIG. 15 can register the character size and print start position of each registered phrase, as represented in areas 1601 to 1603. Although not described in the URL table of FIG. 16, the character color in displaying and printing a registered phrase may also be registered.

A phrase registered in the URL table may also change depending on the time when the registered phrase is displayed and printed.

FIG. 17 is a table showing an example of a URL table stored in the MFP 101 according to the fifth embodiment. In the URL table shown in FIG. 17, even if the URL and user attribute remain unchanged, a registered phrase can change depending on the time zone when the registered phrase is displayed and printed. This is because the possibility at which a third party may touch a printed material changes depending on the time zone of printing. This allows printing a registered phrase corresponding to the possibility of information leakage.

[Other Embodiment]

The present invention may be applied to a system including a plurality of devices (e.g., a host computer, interface device, reader, and printer) or an apparatus (e.g., a copying machine or facsimile apparatus) formed by a single device.

The object of the present invention is also achieved by supplying a storage medium which stores software program codes for implementing the functions of the above-described embodiments to a system or apparatus. In this case, these functions are achieved by reading out and executing the program codes stored in the storage medium by the computer (or the CPU or MPU) of the system or apparatus. In this case, the storage medium which stores the program codes constitutes the present invention.

The storage medium for supplying the program codes includes a floppy® disk, hard disk, optical disk, magnetooptical disk, CD-ROM, CD-R, magnetic tape, nonvolatile memory card, and ROM.

The present invention is not limited to a case where the functions of the above-described embodiments are implemented when the computer executes the readout program codes. Also, the present invention includes a case where an OS (Operating System) or the like running on the computer performs some or all of the actual processes based on the instructions of the program codes and thereby implements the functions of the above-described embodiments.

Furthermore, the present invention includes a case where the functions of the above-described embodiments are implemented after the program codes read out from the storage medium are written in the memory of a function expansion board inserted into the computer or the memory of a function expansion unit connected to the computer. That is, the present invention also includes a case where after the program codes are written in the memory, the CPU of the function expansion board or function expansion unit performs some or all of the actual processes based on the instructions of the program codes and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-108028 filed on Apr. 10, 2006, which is hereby incorporated by reference herein in its entirety.

What is claimed is:

1. An image forming apparatus capable of visibly outputting an object stored in a server apparatus, comprising:
a search unit configured to, when an instruction to designate the object is input, search a storage unit which stores information representing a degree of secrecy of the designated object and a storage location of the designated object in advance in correspondence with each other, wherein the degree of secrecy represents one of at least three levels of secrecy;
a read unit configured to read out, from the storage unit based on a result of the search by said search unit, information which corresponds to the storage location of the designated object and represents the degree of secrecy of the designated object; and
an output unit configured to visibly output, together with the designated object, the information which is read out by said read unit and represents the degree of secrecy of the designated object.

2. The apparatus according to claim 1, further comprising a login unit configured to log in to the image forming apparatus by inputting user information,
wherein the storage unit is configured to store the information representing the degree of secrecy of the designated object in correspondence with a user attribute specified by the user information, and
wherein said read unit is configured to read out, from the storage unit, the information which corresponds to the storage location of the designated object, corresponds to the user attribute, and represents the degree of secrecy of the designated object.

3. The apparatus according to claim 2, wherein
the storage unit is configured to store, in correspondence with the user attribute specified by the user information, a time zone when the information representing the degree of secrecy of the designated object is printed, and
said read unit is configured to read out, from the storage unit, the information which corresponds to the storage location of the designated object and the user attribute, corresponds to the time zone, and represents the degree of secrecy of the designated object.

4. The apparatus according to claim 1,
wherein the storage unit is configured to store, in correspondence with the storage location of the designated object, a character size, a color, a layout, or a combination of the character size, the color, and the layout,
wherein the character size, the color, and the layout are associated with printing the information representing the degree of secrecy of the designated object, and
wherein said output unit is configured to print the information which is read out by said read unit and represents the degree of secrecy of the designated object, based on the character size, color, layout, or the combination thereof.

5. The apparatus according to claim 2,
wherein the storage unit is configured to store, in correspondence with the user attribute specified by the user information, a character size, a color, a layout, or a combination of the character size, the color, and the layout,
wherein the character size, the color, and the layout are associated with printing the information representing the degree of secrecy of the designated object, and
said output unit is configured to print the information which is read out by said read unit and represents the degree of secrecy of the designated object, based on the character size, color, layout, or the combination thereof.

6. The apparatus according to claim 1, further comprising a change unit configured to change, based on an installation location of the image forming apparatus, the information which corresponds to the storage location of the designated object and represents the degree of secrecy of the designated object.

7. The apparatus according to claim 1, further comprising a warning unit configured to generate a warning when said search unit cannot specify the information which corresponds to the storage location of the designated object and represents the degree of secrecy of the designated object.

8. An information processing method in an image forming apparatus capable of visibly outputting an object stored in a server apparatus, comprising:
a search step of, when an instruction to designate the object is input, searching a storage unit which stores information representing a degree of secrecy of the designated object and a storage location of the designated object in advance in correspondence with each other, wherein the degree of secrecy represents one of at least three levels of secrecy;
a read step of reading out, from the storage unit based on a result of the search in the search step, information which corresponds to the storage location of the designated object and represents the degree of secrecy of the designated object; and
an outputting step of visibly outputting, together with the designated object, the information which is read out in the read step and represents the degree of secrecy of the designated object.

9. A non-transitory computer-readable storage medium which stores a computer-executable control program, the program comprising:
search instructions configured to search, when an instruction to designate the object is input, a storage unit which stores information representing a degree of secrecy of the designated object and a storage location of the designated object in advance in correspondence with each other, wherein the degree of secrecy represents one of at least three levels of secrecy;
read instructions configured to read out, from the storage unit based on a result of the search according to the search instructions, information which corresponds to the storage location of the designated object and represents the degree of secrecy of the designated object; and
outputting instructions configured to visibly output, together with the designated object, the information which is read out according to the read instructions and represents the degree of secrecy of the designated object.

10. The apparatus according to claim 1, wherein the designated object is a web page, and the storage location of the web page is a URL.

11. The apparatus according to claim 10, wherein the output unit is further configured to visibly print out together the web page and the information representing the degree of secrecy of the web page.

12. The method according to claim 8, wherein the designated object is a web page, and the storage location of the web page is a URL.

13. The method according to claim 12, wherein the outputting step includes visibly printing out together the web page and the information representing the degree of secrecy of the web page.

14. The non-transitory computer-readable storage medium according to claim 9, wherein the designated object is a web page, and the storage location of the web page is a URL.

15. The non-transitory computer-readable storage medium according to claim 14, wherein the outputting instructions are configured to visibly print out together the web page and the information representing the degree of secrecy of the web page.

16. An information processing apparatus capable of visibly outputting an object stored in a server apparatus, comprising:
- a search unit configured to, when an instruction to designate the object is input, search a storage unit which stores information representing a degree of secrecy of the designated object and a storage location of the designated object in advance in correspondence with each other, wherein the degree of secrecy represents one of at least three levels of secrecy;
- a read unit configured to read out, from the storage unit based on a result of the search by said search unit, information which corresponds to the storage location of the designated object and represents the degree of secrecy of the designated object; and
- an output unit configured to visibly output, together with the designated object, the information which is read out by said read unit and represents the degree of secrecy of the designated object.

17. An information processing apparatus comprising:
- a registration unit configured to register a plurality of URLs, wherein each of the plurality of URLs is associated with information representing a degree of secrecy;
- an input unit configured to input a URL;
- a download unit configured to download, from a Web server, a Web page of the URL inputted by the input unit;
- a display unit configured to display the Web page downloaded by the download unit; and
- a control unit configured to, when the URL input by the input unit corresponds to one of the plurality of URLs registered by the registration unit, control the display unit to display the information representing the degree of secrecy associated with the one of the plurality of URLs registered by the registration unit together with the Web page downloaded by the download unit.

18. The apparatus according to claim 17,
wherein the registration unit is configured to register a phrase associated with each of the plurality of URLs, and
wherein the control unit is configured to control the display unit to display the phrase associated with the one of the plurality of URLs registered by the registration unit when the URL input by the input unit corresponds to the one of the plurality of URLs registered by the registration unit.

19. The apparatus according to claim 17, further comprising a printing unit configured to print the Web page,
wherein the control unit is configured to control the printing unit to print the information representing the degree of secrecy associated with the one of the plurality of URLs registered by the registration unit together with the Web page downloaded by the download unit.

20. The apparatus according to claim 17, further comprising a login unit configured to allow a user to log in to the information processing apparatus,
wherein the control unit is configured to control the display unit to display the information representing the degree of secrecy associated with the one of the plurality of URLs registered by the registration unit, based on an authority of a user who logs in to the information processing apparatus via the login unit.

\* \* \* \* \*